Oct. 29, 1968 D. D. KINSWORTHY 3,407,995
BLOWER ASSEMBLY
Filed Oct. 12, 1966 2 Sheets-Sheet 1
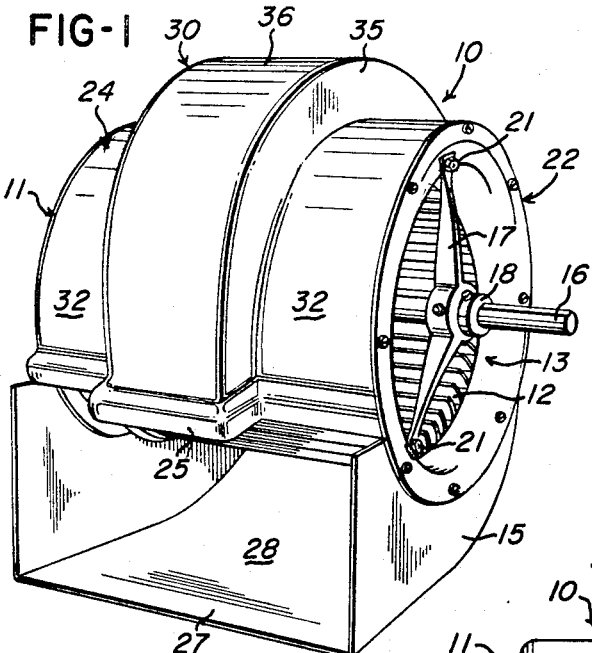
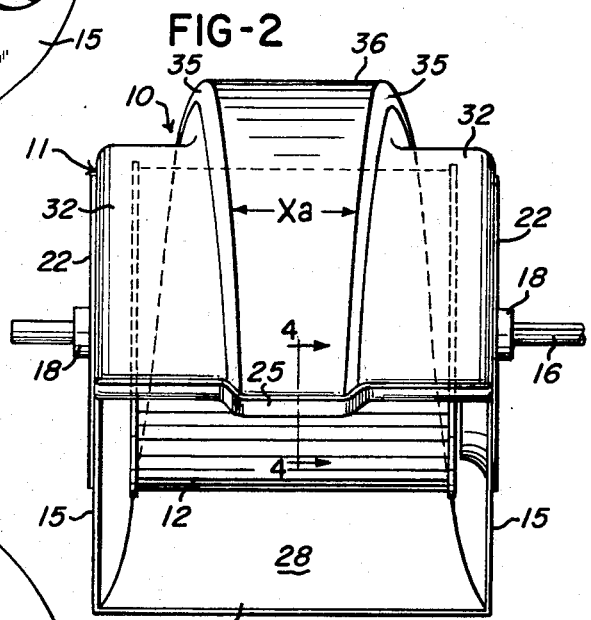
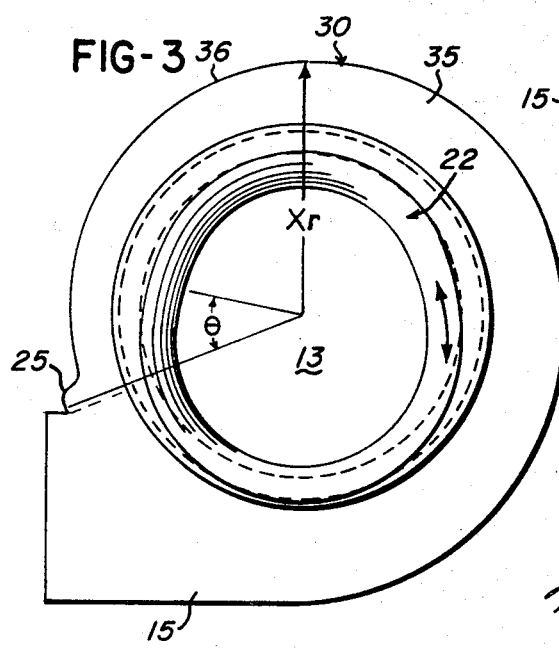
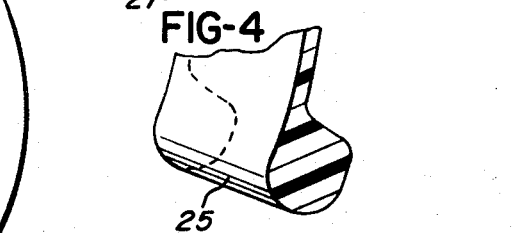
INVENTOR.
DONALD D. KINSWORTHY
BY Marechal, Biebel, French & Bugg
ATTORNEYS Oct. 29, 1968   D. D. KINSWORTHY   3,407,995
BLOWER ASSEMBLY
Filed Oct. 12, 1966   2 Sheets-Sheet 2
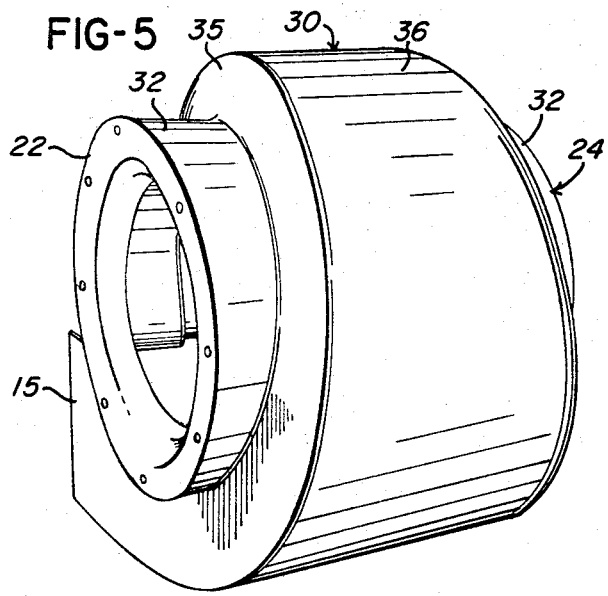
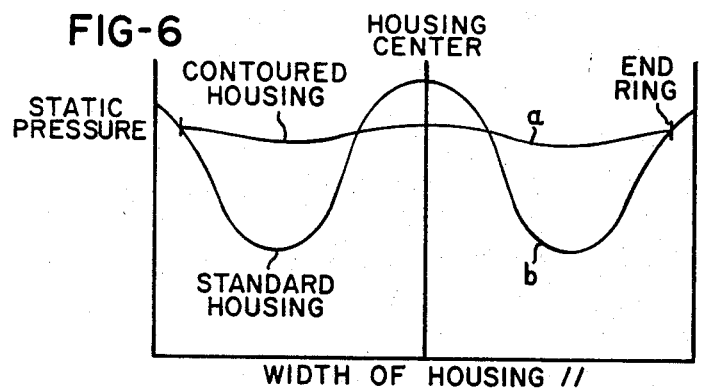

United States Patent Office 3,407,995
Patented Oct. 29, 1968

3,407,995
BLOWER ASSEMBLY
Donald D. Kinsworthy, Dayton, Ohio, assignor to The Lau Blower Company, Dayton, Ohio, a corporation of Ohio
Filed Oct. 12, 1966, Ser. No. 586,288
8 Claims. (Cl. 230—128)

ABSTRACT OF THE DISCLOSURE

A housing for a centrifugal blower wheel having a raised portion in the back wall of the housing for producing a constant total pressure at each point in the housing. An oval venturi inlet ring is used to provide constant velocity of inlet air at each point in the oval inlet, and an angular adjustment of the inlet ring is provided for accommodating changes in loading of the blower.

---

This invention relates to improvements in blowers, and particularly to blower assemblies using centrifugal blower wheels.

In a conventional blower assembly a double or single inlet centrifugal blower wheel of the squirrel cage type is mounted within a volute housing which is wrapped around the outside of the blower wheel. The scroll of the housing extends from a position adjacent the inlet around the blower wheel gradually increasing in distance from the outer periphery of the blower wheel for gradual expansion of the air or gas being propelled by the blower wheel. The air flows axially into the housing through circular inlets in the side walls thereof.

The air is propelled outwardly between the blades by centrifugal force and by the action of the blades to create a pressure within the housing at any point around the blower wheel. However, this pressure is not constant when measured axially along the length of the blower wheel. It varies from a very high pressure at the center of the wheel to substantially zero and sometimes a negative pressure adjacent the end rings of the blower wheel. In effect, the air flows radially outward of the blower wheel near the center until it strikes the scroll of the housing which deflects this air causing it to flow axially of the wheel along the scroll until the side walls of the scroll are reached. At this point, the air is turned down toward the wheel. During this entire time, air is entering and leaving the housing causing the mass of air to be forced around the wheel.

The resulting flow consists of twin vortexes swirling around the housing one on either side of the center of the wheel. As the discharge of the blower is reached, these vortexes start mixing with consequent reduction in speed until there is very little evidence in the discharge air pattern that they even exist. However, this variation in pressure causes the efficiency of the assembly to be reduced thus requiring additional power to drive the blower wheel to obtain a desired output.

Accordingly, an important object of this invention is to provide a housing for a double or single inlet blower wheel which eliminates the aforesaid pressure variations within the housing thereby substantially increasing the efficiency and reducing the power required to operate the blower assembly.

Another object of this invention is to provide a blower assembly having a carefully designed housing which creates a constant total pressure at substantially every point across the width of the blower wheel between the blower wheel and the housing.

A further object of this invention is to provide a housing for a blower assembly which is contoured in such a manner that the vortexes created at the center of the blower wheel are not permitted to flow axially along the blower wheel, and further to provide a housing having a central raised portion which expands both axially and radially in a logarithmic curve.

A further object of this invention is to provide a blower assembly having a housing with a carefully designed inlet opening which permits maximum air to flow into the interior of the blower wheel at an increased efficiency thereby requiring less power to drive the blower wheel.

Other objects and advantages of the invention will be apparent from the following description, the accompanying drawings and the appended claims.

In the drawing:

FIG. 1 is a perspective view showing the front of the blower assembly constructed in accordance with the invention;

FIG. 2 is an elevation view showing the front of the blower assembly;

FIG. 3 is a side elevation view showing the inlet opening into the housing;

FIG. 4 is a sectional view taken along the line 4—4 of FIG. 2;

FIG. 5 is a view similar to FIG. 1 showing the rear portion of the housing; and

FIG. 6 is a graphic comparison between a standard blower assembly and the present invention.

Referring to the drawings wherein a preferred embodiment of the invention is shown, FIG. 1 illustrates a blower assembly 10 having a housing 11 wrapped around a double inlet centrifugal blower wheel 12 having axial inlet openings 13 in each of the side walls 15 of the housing 11. The drive shaft 16 extends entirely through the housing 11 and has the support brackets 17 disposed in each of the inlet openings 13 to support the bearing members 18 which in turn support the drive shaft for rotation. The brackets 17 are secured by the conventional fastening members 21 to the venturi rings 22 which define the inlet openings 13. The drive shaft and the blower wheel 12 are driven in a conventional manner by a motor (not shown) mounted adjacent the housing and having a belt which drives a pulley (not shown) mounted on the drive shaft.

The housing 11 of the blower assembly 10 includes a spiral backwall 24 which extends from the lip 25 around the blower wheel 12 to form the bottom wall 27 of the outlet duct 28. The side walls 15 are suitably shaped to conform to the spiralling backwall 24 to enclose the ends of the housing and support the venturi rings 22. An important feature of the invention is the novel configuration of the backwall 24 which includes a central raised portion 30 which extends from adjacent the lip 25 around the blower wheel 12 expanding axially and radially until it terminates in the outlet duct 28. The outer wall portions 32 of the backwall 24 on either side of the raised portion 30 extend from the lip 25 around the blower wheel 12 gradually decreasing in width to accommodate the increasing axial dimension of the central portion. The outer portions 32 preferably are equally distant from the blower wheel.

The raised portion 30 has a substantially rectangular cross-section with the radial side walls 35 joining the outer portions 32 to the top wall 36 of the raised portion.

However, the particular rectangular configuration is not a limitation of this invention since it is contemplated that the raised portion could assume many different configurations.

In the preferred embodiment, the raised portion expands axially in accordance with the following formula:

$$X_a = \frac{\theta}{K} + \log X_{0a}$$

where $X_a$ is the axial width of the raised portion 30 (FIG. 2);
$\theta$ is the angle of the point under consideration measured from the lip 25 (FIG. 3)
K is a constant which is 590.2 for the axial expansions; and
$X_{0a}$ is the width of the raised portion adjacent the lip 25.

Similarly, the radial expansion may be derived by the formula:

$$X_r = \frac{\theta}{K} = \log X_{0r}$$

where $X_r$ is the radial dimension of the raised portion 30 (FIG. 3);
K is a constant equal to 2895.5 for radial expansion; and
$X_{0r}$ is the radial dimension of the raised portion adjacent the lip and measured from the center of the blower wheel.

In operation, the air is thrown centrifugally from the blower wheel 12 and is forced into the raised portion 30 where the side walls 35 thereof prohibit the air from flowing outwardly toward the ends of the blower wheel 12 where it would reenter the blower wheel. The raised portion thus receives the very high pressure air and gradually expands it around the blower wheel without letting it create the vortexes described above. At the same time, the air being propelled outwardly from the blower wheel adjacent the ends thereof is expanded in a conventional manner by the outer portions 32 of the backwall 24 and is gradually blended into the air within the raised portion.

As a result, there is substantial constant pressure within the housing and this is illustrated in the graph of FIG. 6 wherein at any angle $\theta$ point around the periphery of the blower wheel 12, it will be seen that with this contoured housing 10 the pressure variation along the axis of the blower wheel is substantially constant (curve $a$), as opposed to the very marked variation in the conventional blower housing (curve $b$).

Another important feature of this invention relates to the oval shaped inlets 13 in the housing 21, as defined by the venturi ring 22. It has been found that the required inlet area for a blower wheel varies depending upon the angle around the Venturi inlet and with the load on the blower wheel. As seen in FIG. 3, the oval inlet opening 13 has its larger portion adjacent to the outlet duct 28 with the smaller portion being spaced 180° therefrom. When the blower has little or no loading, it is desirable that the venturi ring 22 be rotated 15° counterclockwise to the direction of the wheel. As resistance is added, the venturi ring 22 is rotated in a direction opposite to the direction of the rotation of the blower wheel until the larger area is approximately 30° above horizontal for maximum loading. At this position, the maximum static efficiency is obtained, and it has been found that the efficiency has been increased 8% by this oval shaped inlet.

While the venturi rings 22 are shown secured rigidly to the side walls 15, it is within the scope of the invention to make this ring easily adjustable so that it can be quickly rotated to compensate for increased or decreased loading, as described above. In most instances, however, the blower is designed for a specific installation with the loading known in advance and therefore the venturi rings 22 can be secured rigidly in position and no adjustment means provided.

While the invention has been described and illustrated in connection with a double inlet centrifugal blower wheel it is within the scope of the invention to construct a single inlet blower wheel assembly which would be in effect one-half of the double inlet assembly. Thus the single inlet unit would have the raised portion above the backwall of the blower wheel and adjacent the side of the housing opposite the inlet.

The invention has thus provided an improved blower wheel assembly wherein increased efficiency is obtained by controlling the vortexes normally created by the blower wheel and the backwall. Similarly, the novel oval shaped inlet opening provides for more efficient air flow into the blower wheel in accordance with the demand so that increased efficiency of the blower assembly is obtained. As a result, the power required to drive a blower wheel assembly of any given size is reduced below that heretofore required.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A constant pressure blower assembly comprising, a contoured housing, a double inlet centrifugal blower wheel disposed within said housing, drive means for supporting said blower wheel and for effecting rotation thereof, said housing having a contoured backwall which extends around said blower wheel from an outlet duct, a raised open U-shaped central portion in said backwall which receives air from the central portions of said blower wheel and reduces substantially the axial flow of air in said housing toward the ends of said blower wheel to increase the efficiency of said housing, said raised portion gradually increasing in width and depth as it progresses around said blower to said outlet duct until it reaches the width and depth of said outlet duct, side walls enclosing the sides of said backwall, and means defining inlet openings in said side walls for flow of air into the said ends of said blower wheel.

2. A blower assembly as defined in claim 1 wherein said backwall has outer portions between said raised portion and said side walls, said outer portions gradually decreasing in width and being spaced from said blower wheel a constant distance.

3. A blower assembly as defined in claim 1 wherein said depth of said central portion increases at a rate equal to $$X_r = \frac{\theta}{K} + \log X_{or}$$

where $X_r$ is the depth at any angle $\theta$ around the scroll starting from the inlet,
K is a constant, and
$X_{or}$ is the depth of the central portion at its starting point.

4. A blower asembly as defined in claim 1 wherein said width of said central portion increases at a rate equal to $$X_a = \frac{\theta}{K} + \log X_{oa}$$

where $X_a$ is the width at any angle $\theta$ around the scroll starting from the inlet,
K is a constant, and
$X_{oa}$ is the width of the central portion at its starting point.

5. A blower assembly as defined in claim 1 comprising, a ring defining an oval shaped inlet mounted in each said openings in said side walls aligned with the inlet openings of said blower wheel, said oval openings having the larger portion aligned with the portion of the scroll development immediately upstream of said outlet duct, and the smaller portion of said oval openings being spaced 180° from the larger portion thus providing maximum air flow into said inlet opening near said outlet duct to increase the efficiency of the blower assembly.

6. A blower assembly as defined in claim 5 wherein means are provided for adjusting said rings about the axis of said inlet opening to compensate for varying loads on the blower assembly.

7. A blower assembly as defined in claim 6 wherein said rings are rotated in a direction opposite to the direction of rotation of said blower wheel in response to an increase in load on the blower assembly.

8. A blower assembly as defined in claim 5 wherein said rings each includes means defining a Venturi to facilitate flow of air therethrough.

References Cited

UNITED STATES PATENTS

| | | | |
|---|---|---|---|
| 655,602 | 8/1900 | Burns | 230—1336 |
| 820,397 | 5/1906 | Davidson | 230—127 |
| 820,398 | 5/1906 | Davidson | 230—127 |
| 820,399 | 5/1906 | Davidson | 230—127 |
| 1,118,739 | 11/1914 | Carter | 230—1336 |
| 1,543,740 | 6/1925 | Wahle | 230—128 |
| 2,452,274 | 10/1948 | Walters | 230—128 |
| 3,246,834 | 4/1966 | Swenson | 230—128 |

HENRY F. RADUAZO, *Primary Examiner.*